United States Patent [19]

Yamazaki

[11] Patent Number: 5,124,727
[45] Date of Patent: Jun. 23, 1992

[54] PAGE PRINTER CAPABLE OF EFFICIENTLY PRINTING DATA ON PAPER SHEETS HAVING DIFFERENT SIZES

[75] Inventor: Hitoshi Yamazaki, Oome, Japan

[73] Assignees: Casio Computer Co., Ltd.; Casio Electronics Manufacturing Co., Ltd., both of Tokyo, Japan

[21] Appl. No.: 631,891

[22] Filed: Dec. 21, 1990

[30] Foreign Application Priority Data

Dec. 26, 1989 [JP] Japan .................. 1-334894

[51] Int. Cl.$^5$ ............... B41J 11/00; G03G 15/00
[52] U.S. Cl. .................... 346/134; 355/311; 355/317; 395/101
[58] Field of Search .......... 355/309, 311, 317; 271/1, 9; 358/296, 300, 401, 449, 451; 346/134; 364/519

[56] References Cited

U.S. PATENT DOCUMENTS

| | | | |
|---|---|---|---|
| 4,933,772 | 6/1990 | Ikenoue et al. | 358/300 |
| 4,939,554 | 7/1990 | Hirabayashi et al. | 355/317 |
| 4,985,736 | 1/1991 | Kawano et al. | 355/311 |
| 5,008,760 | 4/1991 | Shimiza et al. | 358/451 |

FOREIGN PATENT DOCUMENTS 63-52566 3/1988 Japan .
63-82250 4/1988 Japan .

Primary Examiner—Joan H. Pendegrass
Attorney, Agent, or Firm—Nixon & Vanderhye

[57] ABSTRACT

A page printer includes a first and a second paper feed sections for storing a first and a second paper sheets respectively, a printing mechanism, a mediation control circuit, and a printing operation control circuit. The mediation control circuit identifies printing data sequentially input from a host unit and generates paper feed operation designation data, printing operation designation data, and image data. The printing operation control circuit controls the printing mechanism in accordance with the paper feed operation designation data, the printing operation designation data, and the image data. The mediation control ciruit generates feed operation designation data with respect to the second paper sheet on the basis of the printing data during execution of a printing operation with respect to the first paper sheet, and setting a paper feed operation condition for the second paper sheet in the printing operation control circuit before the printing operation with respect to the first paper sheet is completed. The printing operation control circuit selects the second paper feed section, in which the second paper sheet is stored, after a paper feed operation with respect to the first paper sheet is completed and before a printing operation for the first paper sheet is completed, in accordance with the paper feed operation condition.

11 Claims, 8 Drawing Sheets

PAGE PRINTER CAPABLE OF EFFICIENTLY PRINTING DATA ON PAPER SHEETS HAVING DIFFERENT SIZES

BACKGROUND OF THE INVENTION

1. Field of the Invention

The present invention relates to a page printer for printing data, received from a host unit, in units of pages of printing paper.

2. Description of the Related Art

Various types of page printers, such as LCD printers, LED printers, and laser printers, include a paper feed cassette for storing paper sheets used for print processing, and a paper discharge section for storing paper sheets for which print processing is completed. A paper sheet in the paper feed cassette is conveyed to an image forming section by a paper feed mechanism. A toner image formed by the image forming section is transferred onto the paper sheet. After the toner image on the paper sheet is fixed, the paper sheet is discharged to the paper discharge section.

In a printer of this type, in addition to a standard paper feed cassette arranged in the printer, a paper feed section for another type of paper feed cassette may be arranged to perform print processing with respect to paper sheets having different sizes or qualities. In a conventional printer, when paper feed is to be performed by using a plurality of paper feed cassettes in this manner, after an image is formed on a paper sheet fed from one paper feed cassette, and the paper sheet is completely discharged to the paper discharge section, another paper feed cassette is selected/designated to feed the next paper sheet from the other paper feed cassette. That is, when a paper feed cassette in use is to be switched to another cassette during a series of printing operations, paper feed from another paper feed cassette is started after a paper sheet which is conveyed in a convey mechanism is discharged to the paper discharge section.

In a page printer, as described above, a paper type in use is changed to another type in the following manner. After print processing for a paper sheet of a previous type is completed, and the paper sheet is discharged to the paper discharge section, a switching operation of the paper feed sections is performed. A paper sheet is fed from the paper feed section switched from the previous one, and printing processing is subsequently performed. Such a procedure is based on the scheme of a copying machine having a similar paper feed mechanism. In a copying machine, a change in paper size generally means a change in document size, and replacement of documents takes a little time. That is, there is no necessity to switch the paper feed sections instantly. Therefore, such a scheme poses no problems in the copying machines.

In a page printer, however, printing data transferred from a host unit corresponds to documents in a copying machine. If generation of image data to be printed out is performed at a high speed, paper feed is required almost incessantly regardless of image size. This necessity is increased with an increase in distance from a paper feed section to a standby portion of a paper sheet. Therefore, a switching operation of paper feed sections must be quickly performed in accordance with a change in size of a paper sheet for which printing is performed.

In the conventional printer having the above-described arrangement, however, the following problem is posed because its paper feed operation is based on the scheme of the conventional copying machines. In the conventional printer, even if it is analyzed that printing control data, received from a host unit during a printing operation, includes a paper feed cassette switching command, switching of paper feed cassettes cannot be performed unless a paper sheet which is conveyed in the convey mechanism is completely discharged into the paper discharge section. For this reason, when consecutive printing processing is to be performed while for example, paper sizes or paper qualities are sequentially changed, the paper printing rate per unit time (i.e., throughput) is decreased. Therefore, the conventional printer cannot efficiently perform print processing.

SUMMARY OF THE INVENTION

It is an object of the present invention to provide a page printer which can perform efficient print processing even when paper feed processing is performed by using a plurality of paper feed cassettes.

In order to achieve the above object, according to the present invention, there is provided a page printer comprising:

a plurality of paper feed sections including a first paper feed section for storing a first paper sheet, and a second paper feed section for storing a second paper sheet different from the first paper sheet;

a printing mechanism for printing desired image data on the first and second paper sheets sequentially conveyed from the first and second paper feed sections in a predetermined order;

interface control means for identifying printing data sequentially input from a host unit and generating paper feed operation designation data associated with the plurality of paper feed sections, printing operation designation data associated with the printing mechanism, and image data to be printed; and printing operation control means for controlling the printing mechanism in accordance with the paper feed operation designation data, the printing operation designation data, and the image data generated by the interface control means, wherein the interface control means includes means for generating paper feed operation designation data with respect to the second paper sheet on the basis of the printing data during execution of a printing operation with respect to the first paper sheet, and setting a paper feed operation condition for the second paper sheet in the printing operation control means before the printing operation with respect to the first paper sheet is completed, and the printing operation control means includes means for selecting the second paper feed section, in which the second paper sheet is stored, after a paper feed operation with respect to the first paper sheet is completed and before a printing operation for the first paper sheet is completed, in accordance with the paper feed operation condition.

According to the present invention, when generation of image data with respect to the first paper sheet is completed and a DMA (Direct Memory Access) transfer section is set in a data output mode to output the image data to a printer engine section and perform an image forming operation so as to actually print the data on the first paper sheet, a CPU can execute analysis of printing data with respect to the second paper sheet to be processed next. When generation of image data for the second paper sheet is also performed at a high speed, the image data for the second paper sheet is set in a frame memory before an image forming operation with respect to the first paper sheet is completed. Therefore, in order to perform consecutive image forming operations as efficiently as possible and to increase the throughput, the second paper sheet must be present at the standby portion immediately after the first paper sheet passes through the standby portion even if the first and second paper sheets are fed from different paper feed sections (upper and lower sections). For this purpose, according to the present invention, during an image forming operation with respect to the first paper sheet, a specific paper feed section to be designated, from which the second paper sheet is to be fed, is discriminated by analyzing a command designated/input from the host unit in advance. Thereafter, the discriminated paper feed section is designated in the paper feed control section on the printer engine side so that when the image forming operation for the first paper sheet is completed, and the next paper feed operation is ready (or at a timing at which the next paper feed operation is expected to be ready), paper feed can be immediately performed from the proper paper feed section corresponding to the designation of the command.

In this manner, during an image forming operation for a previous paper sheet, all the printing operation designation contents for the subsequent paper sheet are analyzed, and the analysis data are designated in the movable component controllers on the printer engine side in advance. With this processing, consecutive printing operations can be incessantly performed, and a page printer having a very high throughput can be provided.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be described below with reference to the accompanying drawings.

Figure 2:
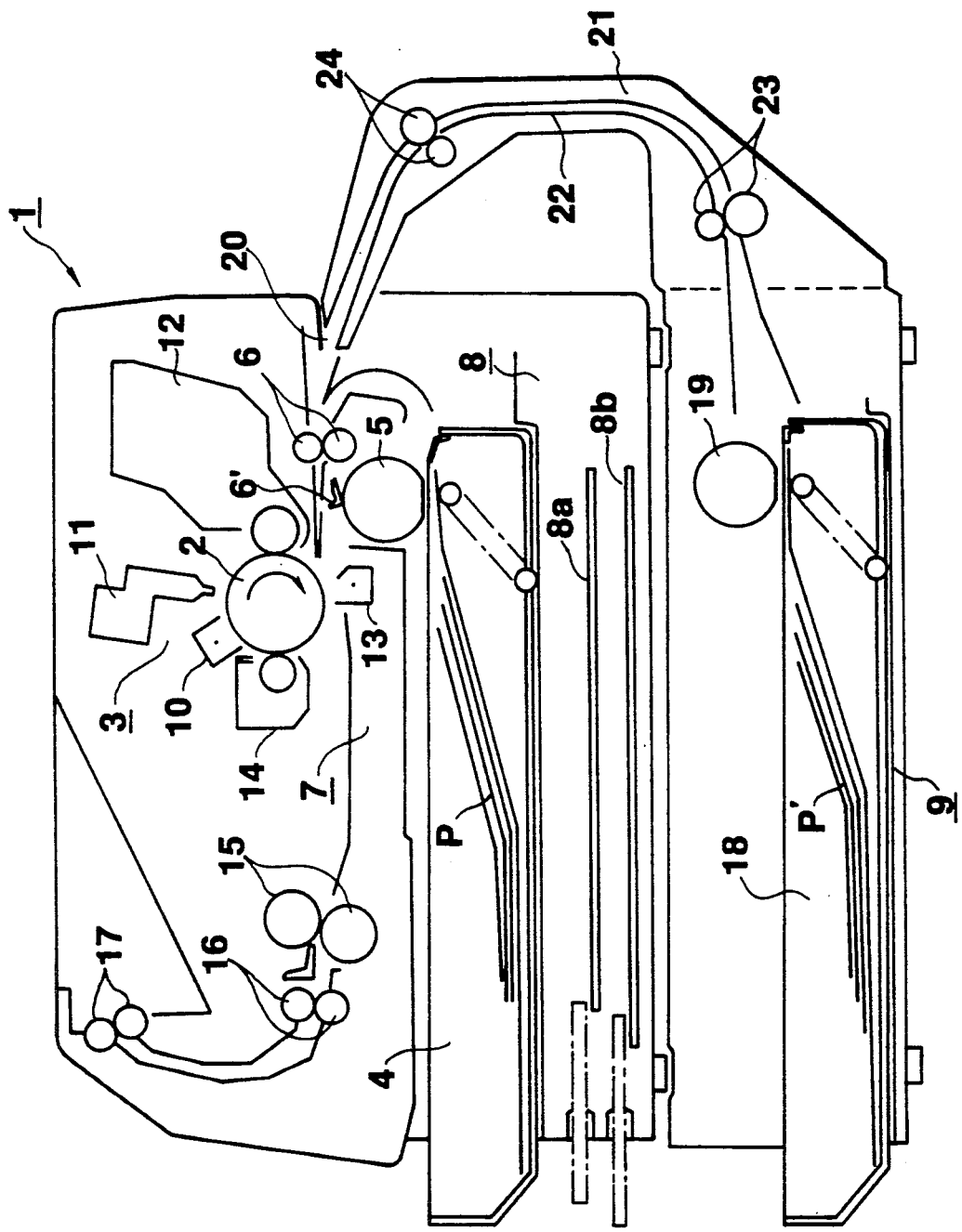
FIG. 2 is a view showing an overall arrangement of the page printer in FIG. 1.

FIG. 2 shows an overall arrangement of an LED printer used as a page printer of this embodiment. Referring to FIG. 2, an LED printer 1 comprises an image forming section 3 constituted by a photosensitive drum 2 and the like, a paper convey mechanism 7 (to be described later), and a control box 8 for housing control boards. The LED printer 1 is mounted on a paper feed unit 9 as an option.

The image forming section 3 comprises the photosensitive drum 2; the following components sequentially arranged around the outer surface of the photosensitive drum 2: a charger 10, an LED head 11, a developing unit 12, a transfer unit 13, and a cleaner 14; and the paper convey mechanism 7, constituted by slip rollers 6, standby plates 6', fixing rollers 15, convey rollers 16, discharge rollers 17, and the like, for conveying a paper sheet P picked up from a paper feed cassette 4 by a pickup roller 5. The charger 10 serves to perform initial charging of the photosensitive surface of the photosensitive drum 2 which is rotated in a direction indicated by an arrow in FIG. 2. The LED head 11 is used to expose the photosensitive surface in accordance with image data. The developing unit 12 develops an electrostatic latent image, formed on the photo-sensitive surface by the above-mentioned exposure operation, into a toner image. The transfer unit 13 transfers the toner image onto the paper sheet P. The cleaner 14 serves to remove a residual toner from the photosensitive surface. The fixing rollers 15 convey the paper sheet P having the toner image transferred thereto while fixing the toner image to the paper sheet P.

The paper convey mechanism 7 comprises the paper feed cassette 4 for storing a predetermined number of paper sheets, the pickup roller 5 for picking up the paper sheet P from the paper feed cassette 4, the slip rollers 6 for conveying the paper sheet P, the standby plates 6' for temporarily holding the paper sheet P or a paper sheet P' and feeding it again at a proper timing at which the leading end of the paper sheet P or P' coincides with the leading end of a toner image formed on the photosensitive drum 2, the fixing rollers 15, the convey rollers 16, the discharge rollers 17, and the like. Note that the fixing rollers 15 serve to convey a paper sheet while fixing a toner image, transferred by the transfer unit 13, to the paper sheet.

The control box 8 houses an interface controller board 8a having an interface controller (to be described later) and a printer controller board 8b having a printer controller.

The paper feed unit 9 arranged, as an option, below the page printer 1 incorporates a paper feed cassette 18 and a pickup roller 19. The paper feed unit 9 is designed to feed the paper sheet P' from the paper feed cassette 18 by using the pickup roller 19. A paper convey unit 21 is attached to extend from the paper feed unit 9 to a paper feed port 20 formed in the rear side surface of the printer 1. The paper convey unit 21 incorporates guide plates 22 and convey rollers 23 and 24 and serves to convey a paper sheet, picked up from the paper feed cassette 18, to the slip rollers 6 through the paper feed port 20 of the printer 1. The paper sheet P' is conveyed from the slip rollers 6 by the same convey mechanism as that for the paper sheet P. Note that the paper sheet P' stored in the paper feed cassette 18 in the paper feed unit 9 and a paper sheet stored in the paper feed cassette 4 differ in, e.g., paper size or color (quality).

In addition, the paper feed unit 9 incorporates a driving motor (independent of a motor for the printer main body) for driving the pickup roller 19, the convey rollers 23 and 24, and the like. Since the distance from the pickup roller 5 on the printer main body side to the standby plates 6' is different from the distance from the pickup roller 19 on the paper feed unit 9 side to the standby plates 6', the driving motor arranged on the paper feed unit 9 side is designed to rotate the pickup roller 19, the convey rollers 23 and 24, and the like at a speed higher than a rotational speed of the pickup roller 5 so that it takes the same period of time to pick up a paper sheet from either of the two paper feed cassettes and convey it to the standby plates 6'.

The slip rollers 6 are designed to convey a paper sheet with such a clamping force that a conveying force is lost to cause the paper sheet to slip on the rollers when a load exceeding a predetermined value is applied to the paper sheet. When the standby plates 6' protrude into the paper convey path, and when the leading end of a paper sheet is locked by the standby plates 6', and an overload is applied to the paper sheet, the paper sheet slips on the rollers and the conveying force is lost, thus keeping the paper sheet to stand by. In addition, the slip rollers 6 also serve as a shock absorber for reducing the conveying speed of a paper sheet, which is conveyed from the paper feed unit 9 to the printer main body side at a high speed, until it reaches the standby plates 6' (a paper sheet slips not only when it is stopped but also when it is pushed from behind).

In this embodiment, the convey path length from the end of the paper feed cassette 4 in the paper convey direction to the standby plates 6' is about 120 mm, whereas the convey path length from the end of the lower paper feed cassette 18 in the paper convey direction to the standby plates 6' is about 420 mm.

Figure 1:
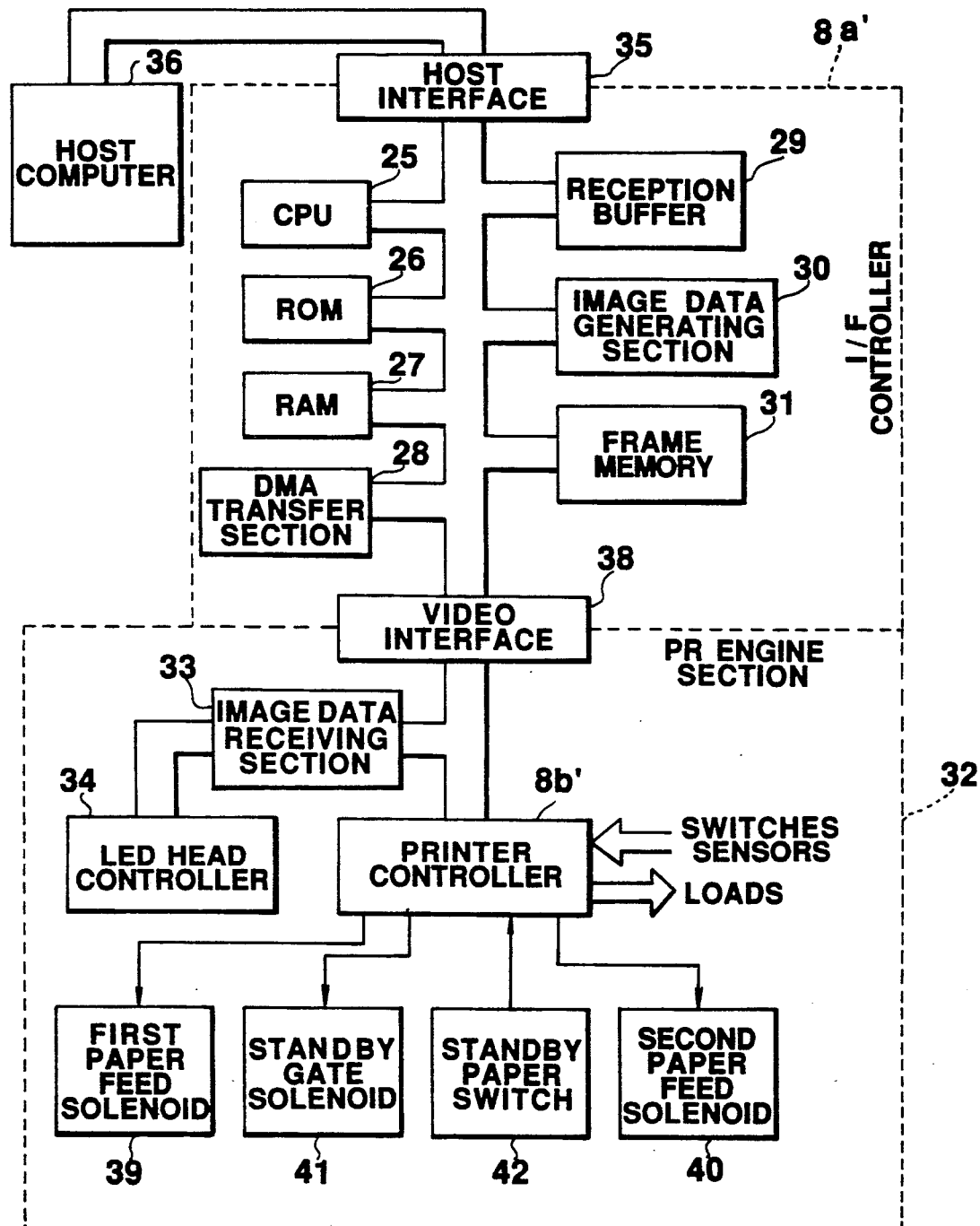
FIG. 1 is a block diagram showing a circuit arrangement of a page printer according to an embodiment of the present invention.

FIG. 1 is a block diagram showing a circuit arrangement of the control box 8. Note that FIG. 1 also shows a host computer 36 as an external host unit. Referring to FIG. 1, an interface controller (to be referred to as an I/F controller hereinafter) 8a' is equivalent to a circuit arrangement in the interface controller board 8a, and a printer engine section (to be referred to as a PR engine section hereinafter) 32 is equivalent to a circuit arrangement attached to the printer controller board 8b for controlling image forming operations. The I/F controller 8a' comprises a CPU (central processing unit) 25, a host interface (to be referred to as a host I/F hereinafter) 35, a ROM 26, a RAM 27, a reception buffer 29, an image data generating section 30, and a frame memory 31. The PR engine section 32 comprises a printer controller 8b' constituted by a one-chip microcomputer incorporating a CPU, a ROM, and a RAM, an LED head controller 34 for driving the LED head 11, switches and sensors for detecting driving loads for driving the respective mechanical components and states of a paper sheet and movable portions, and the like.

The host computer 36 as a host unit is a circuit for outputting character codes and control data in its own specifications to the I/F controller 8a' through the host I/F 35.

The host I/F 35 serves as an I/O section for connecting the host computer 36 as a host unit of the printer 1 to the I/F controller 8a'. The host computer 36 outputs printing data, such as character codes, and printing control data (to be referred to as a command hereinafter), to the I/F controller 8a' through the host I/F 35.

The CPU 25 controls the respective components in accordance with program data stored in the ROM 26 or the RAM 27. For example, the CPU 25 writes the abovementioned character codes or command, input through the host I/F 35, in the reception buffer 29 in accordance with program data in the ROM 26. The CPU 25 reads out data such as character codes written in the reception buffer 29. The character codes are then output to the image data generating section 30 to be converted into corresponding dot pattern data. The dot pattern data is written in the frame memory 31. In addition, command is output to the CPU 25 so as to be discriminated thereby. The CPU 25 then executes corresponding processing.

Figure 3:
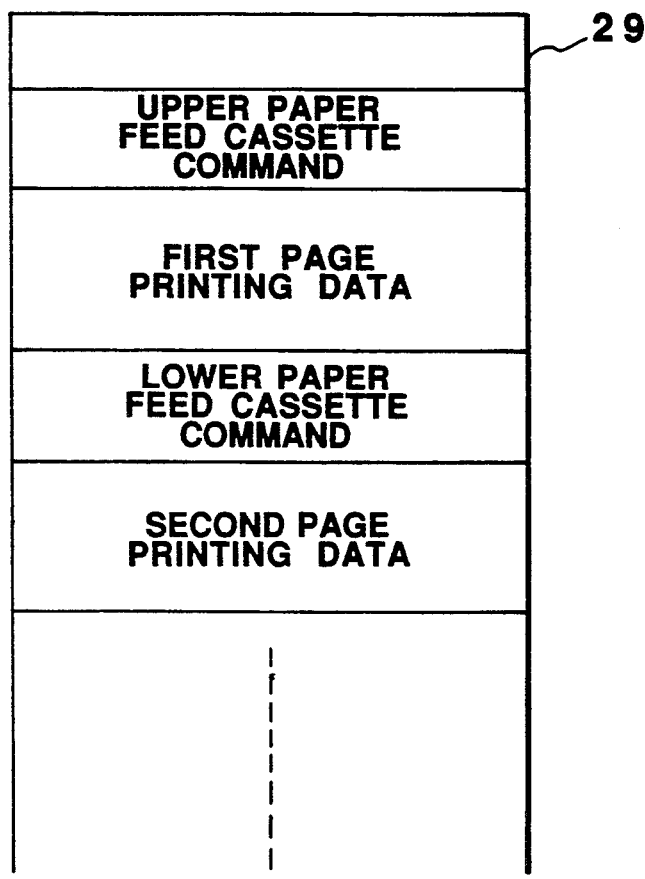
FIG. 3 is a view showing a format of data to be stored in a reception buffer.

The reception buffer 29 is constituted by a predetermined memory area. FIG. 3 shows a state of printing data stored in the reception buffer 29. More specifically, the printing data stored in the reception buffer 29, which are shown in FIG. 3, are: a command for designating paper feed from, e.g., the upper paper feed cassette, i.e., the paper feed cassette 4; printing data of the first page; a command for designating paper feed from the lower paper feed cassette, i.e., the paper feed cassette 18; and printing data of the second page.

The frame memory 31 has a capacity large enough to store dot pattern data corresponding to one page and hence can store one-page dot pattern data converted by the image data generating section 30. A DMA transfer section 28, as will be described in detail later, is a circuit for outputting dot pattern data, written in the frame memory, to the printer controller circuit side without receiving control from the CPU 25.

The I/F controller 8a' and the printer controller 8b' are connected to each other through a video interface 38. Start and restart signals and various control signals for designating execution of printing operations (to be described later) are output from the I/F controller 8a' to the printer controller 8b' through the video interface 38 in accordance with a state of dot pattern data generated in the I/F controller 8a'. The printer controller 8b' outputs, e.g., high voltage output control signals to the charger 10 and the transfer unit 13 described above and rotation control signals to the photosensitive drum 2 and the respective convey rollers. In addition, the printer controller 8b' receives detection data from the respective switches and sensors. Especially as loads associated with paper feed, the following solenoids are connected to the printer controller 8b': a first paper feed solenoid 39 for rotating the pickup roller 5 once; a second paper feed solenoid 40 for rotating the pickup roller 19 once; and a standby gate solenoid 41 for vertically moving the standby plates 6'. The printer controller 8b' outputs control signals (to be described later) to these loads. Furthermore, as a sensor associated with paper feed, a standby paper switch 42 arranged in front of the standby plates 6' is connected to the printer controller 8b'. When the paper sheet P or P' passes a position immediately under the standby switch 42, the switch 42 detects this and outputs a detection signal to the printer controller 8b'. Moreover, other switches and sensors (not shown) are connected to the printer controller 8b', and various types of signals required for printing operation control are supplied to the printer controller 8b'.

Printing operations with respect to the paper sheets P and P' in the printer 1 having the above-described arrangement will be described below.

Figure 4:
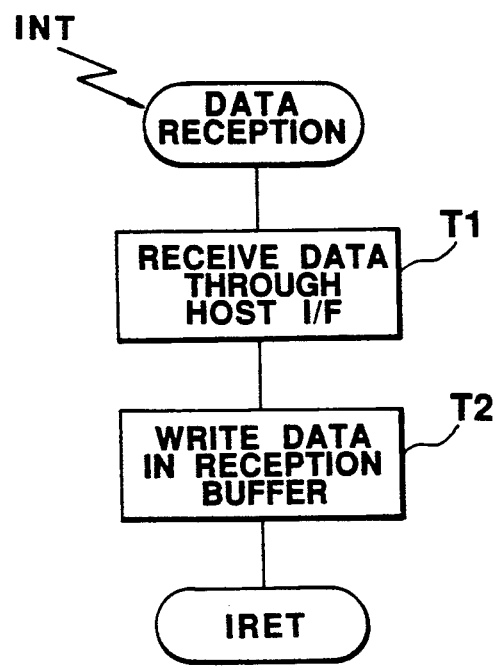
FIG. 4 is a flow chart for explaining reception of printing data.
Figure 5:
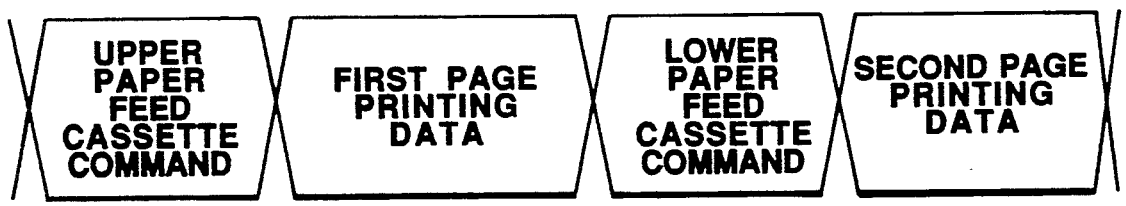
FIG. 5 is a view showing an arrangement of input printing data.

When the printer 1 receives printing data from the host computer 36 through the host I/F 35, the CPU 25 sequentially inputs the printing data to the reception buffer 29 in accordance with a control program in the ROM 26 (steps T1 and T2 in a flow chart of FIG. 4). If the printing data supplied from the host computer 3 at this time includes an upper paper feed cassette designation command, first page printing data, a lower paper feed cassette designation command, and second page printing data, shown in FIG. 5, the respective data are input to the reception buffer 29 in a state shown in FIG. 3.

Figure 6:
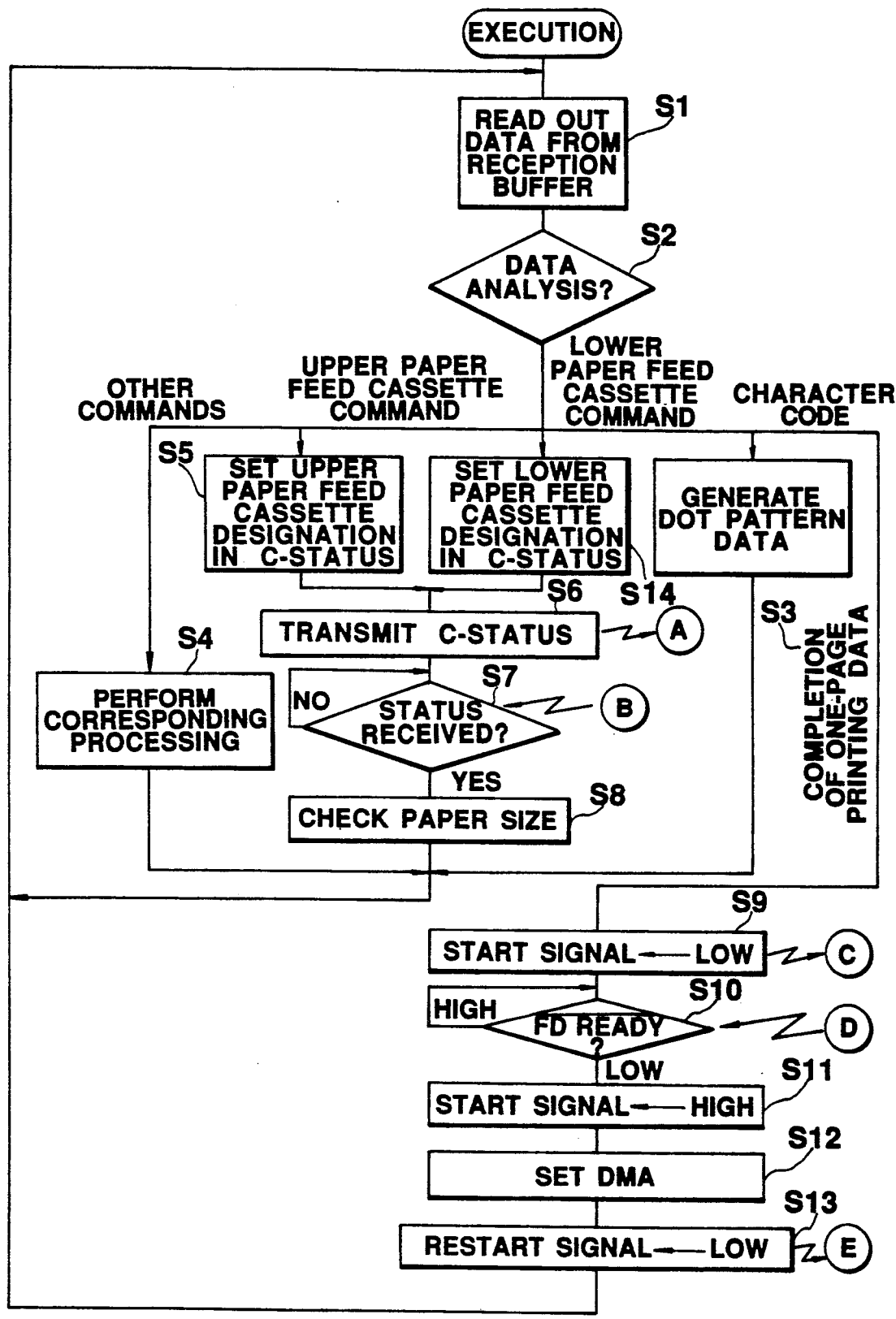
FIGS. 6, 8, and 9 are flow charts for explaining printing operations according to an embodiment of the present invention.
Figure 7:
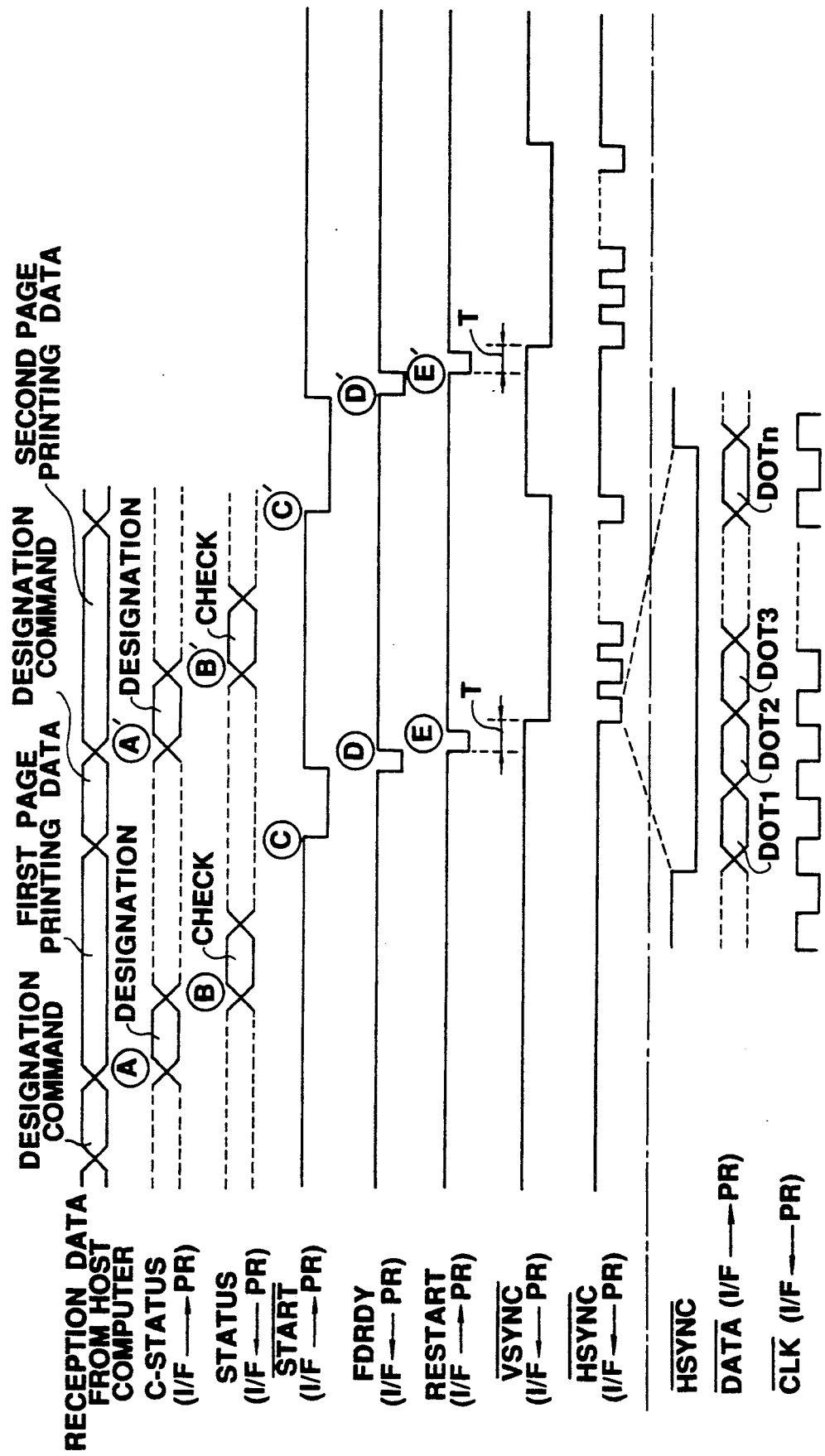
FIG. 7 is a timing chart for explaining printing operations according to an embodiment of the present invention.
Figure 8:
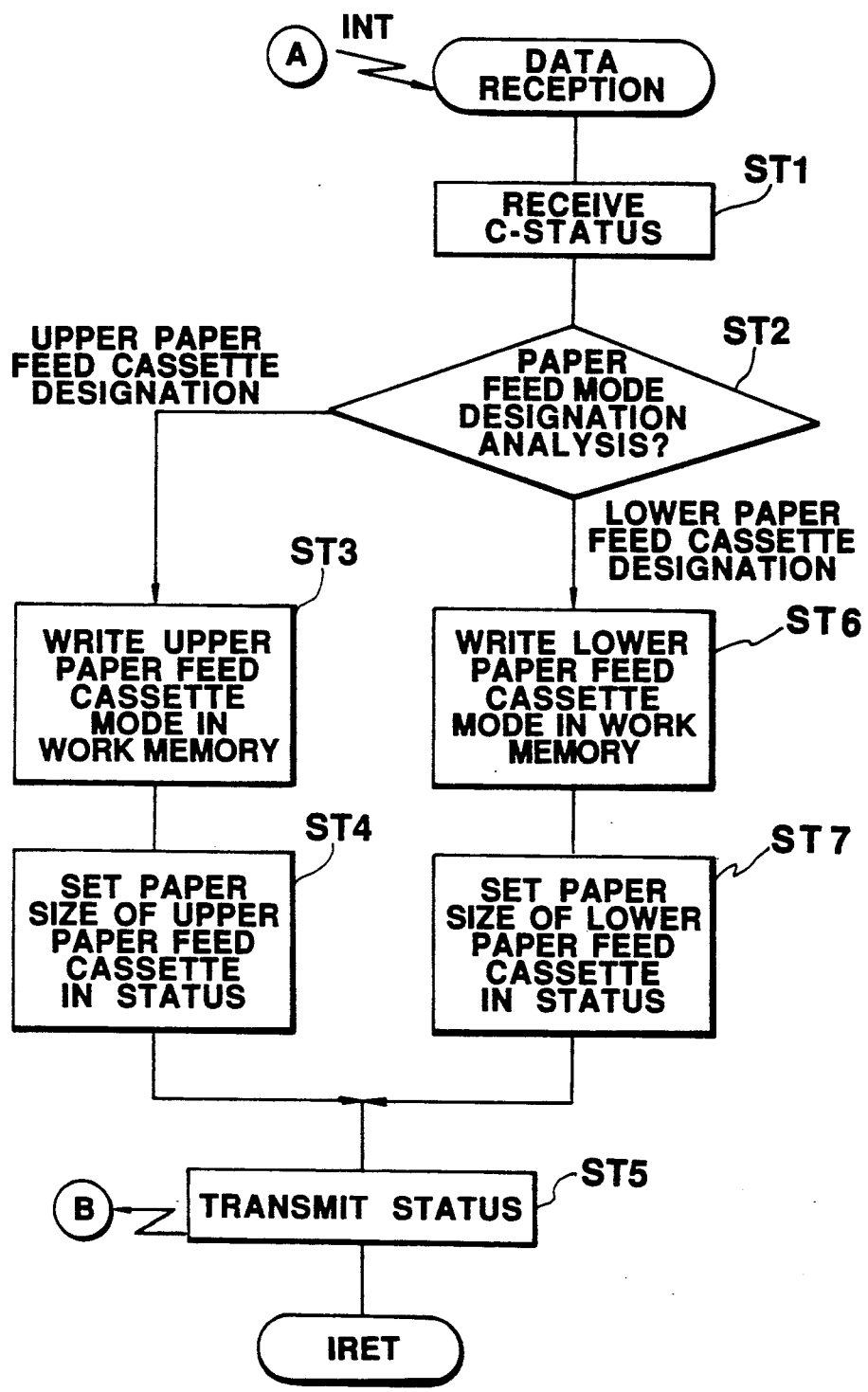

When the printing data is input to the reception buffer 29, the CPU 25 subsequently reads out the data written in the reception buffer 29 and forms dot pattern data in the frame memory 31. More specifically, as indicated by a flow chart in FIG. 6, the CPU 25 sequentially reads out the data from the reception buffer 29 and performs command decoding (step (to be referred to as S hereinafter) 1 and S2). If the readout data is a character code, the CPU 25 causes the image data generating section 30 to convert it into corresponding dot pattern data and sequentially writes the data in the frame memory 31 (S3). If the readout data is command data, the CPU 25 performs corresponding processing (S4). If the readout data is an upper paper feed cassette designation command, the CPU 25 sets a flag indicating the upper paper feed cassette designation in a C-STATUS data storage area in the RAM 27, and transmits this C-STATUS data to the printer controller 8b' through the video interface 38 (S5, S6, and Ⓐ). Upon reception of the C-STATUS data, the printer controller 8b' performs processing in accordance with a flow chart shown in FIG. 8. For example, if the flag indicating the upper paper feed cassette designation is detected, the printer controller 8b' sets an upper paper feed cassette mode in a work memory (not shown) arranged therein (step (to be referred to as ST hereinafter) 1 to ST3). Thereafter, the printer controller 8b' sets, e.g., size data of the paper sheets P, stacked on the paper feed cassette 4, in a STATUS data storage area in an internal memory, and transmits this STATUS data to the I/F controller 8a' through the video interface 38 (ST4, ST5, and Ⓑ). Note that transmission/reception of signals between the I/F controller 8a' and the printer controller 8b' is performed at timings shown in FIG. 7.

When paper size data of the paper sheets stored in the upper paper feed cassette is received from the printer controller 8b' as the STATUS data, the CPU 25 checks whether the paper size data coincides with a paper size designated by a command from the host computer 36 (S7 and S8).

Figure 9:
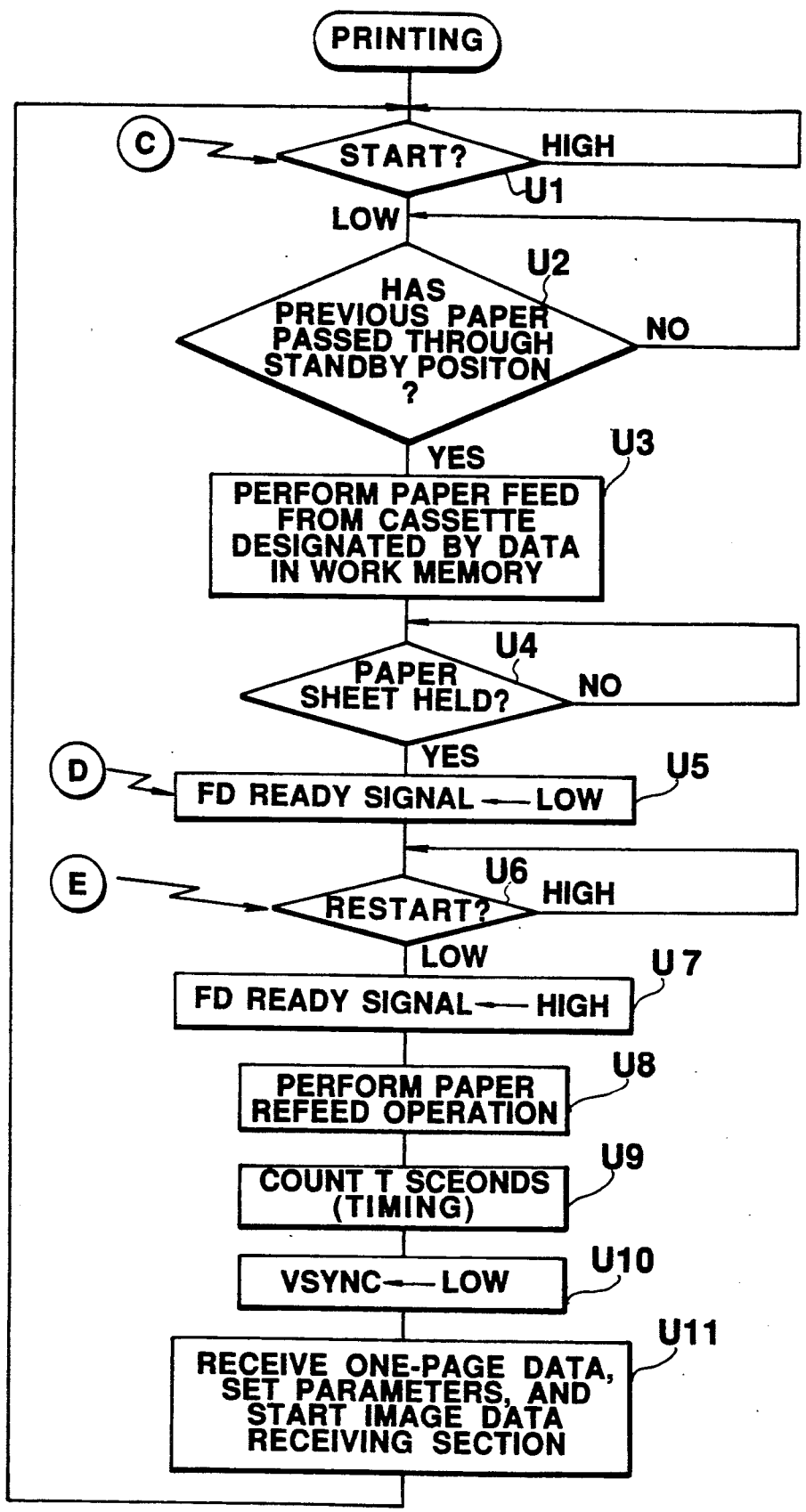

When dot pattern data corresponding to one page is written in the frame memory 31 after the above-described image data generating operation, the CPU 25 outputs a start signal for designating execution of a printing operation (S9). More specifically, a start signal of low level is transmitted to the printer controller 8b' through the video interface 38 (S9 and Ⓒ). The signal is output at a timing shown in FIG. 7. Upon reception of this signal, the printer controller 8b' checks whether a previous paper sheet passes through the standby plates 6', in accordance with a flow chart shown in FIG. 9. In this case, since no previous paper is present when printing is performed on the first paper sheet P in the printer 1, the printer controller 8b' performs paper feed processing from the upper paper feed cassette (step (to be referred to as U hereinafter) 1 to U3) in accordance with the data designating the upper paper feed cassette which has been stored in the work memory in the above-described processing (ST3). That is, the printer controller 8b' outputs a driving signal to the first paper feed solenoid 39 to turn it on. The solenoid 39 then rotates the pickup roller 5 to pick up the paper sheet P from the paper feed cassette 4.

When the paper sheet P is conveyed and the leading end of the paper sheet P reaches the standby plates 6', the standby paper switch 42 detects this. The printer controller 8b' then outputs an FD ready signal indicating this detection to the CPU 25 through the video interface 38 (U4, U5, and Ⓓ). The FD ready signal is output at a timing shown in FIG. 7. Upon reception of the FD ready signal, the CPU 25 restores the above-mentioned start signal to high level, sets the DMA transfer section 28, and outputs a restart signal to the printer controller 8b' (S10, S11, S12, S13, and Ⓔ).

Upon reception of the restart signal, the printer controller 8b' restores the FD ready signal to high level and refeeds the paper P which has reached the standby plates 6' and has been in a standby state in the above-described manner. More specifically, the printer controller 8b' outputs a driving signal to the standby gate solenoid 41 to turn it on to move the standby plates 6' vertically, e.g., downward so as to convey the paper sheet P toward the transfer unit 13 (U6 to U8). After this operation, the printer controller 8b' outputs a vertical sync signal (VSYNC) of a low level to the DMA transfer section 28 through the video interface 28 after T seconds are counted by a timer (not shown), and at the same time starts an image data receiving section 33 (U9 to U11). By this time, the CPU 25 has already set the DMA transfer section 28 in the above-mentioned processing (S12), and hence the one-page dot pattern data written in the frame memory 31 is output from the LED head controller 34 to the LED head 11 through the video interface 38 and the image data receiving section 33 in response to the vertical sync signal (VSYNC). The LED head 11 optically writes an image on the uniformly charged photosensitive drum 2 in accordance with the supplied data, thus forming an electrostatic latent image on the photosensitive drum 2. The electrostatic latent image is developed into a toner image by the developing unit 12. The toner image is then transferred onto the paper sheet P which is conveyed in the direction of the transfer unit 13, as described above. Note that while the vertical sync signal is kept output, a horizontal sync signal (HSYNC) corresponding to oneline printing on the paper sheet P is output by a time corresponding to required printing lines. During this period, dot data is output in synchronism with a clock signal (CLK). When the print processing with respect to the paper sheet P is completed in this manner, the toner image is thermally fixed by the fixing rollers 15 and is conveyed in the paper discharge direction.

Assume that the next print processing is to be performed with respect to the paper sheet P' in the paper feed cassette 18. In this case, even during the above-described processing, the lower paper feed cassette designation command is set in the reception buffer 29, as shown in FIG. 3. The CPU 25 reads out the data written in the reception buffer 29 and forms dot pattern data in the frame memory 31 in the same manner as described above (S1 to S8). At this time, the lower paper feed cassette designation command is set as a paper feed command, and hence a flag indicating lower paper feed cassette designation is set in the C-STATUS data area in the RAM 27 (S14). This C-STATUS data is transmitted to the printer controller 8b' through the video interface 38 in the same manner as described above (S5, S6, and Ⓐ)). Upon reception of this signal, the printer controller 8b' performs processing in accordance with a flow chart in FIG. 8, and sets a lower paper feed cassette mode in the work memory (ST6). In addition, the printer controller 8b' sets paper size data of paper sheets in the lower paper feed cassette in the STATUS data area and transmits the STATUS data to the CPU 25 (ST7, ST5, and Ⓑ'). Upon reception of the signal indicating the paper size of the lower paper feed cassette by the STATUS data transmission, the CPU 25 checks coincidence of the paper sizes in the same manner as described above (S7 and S8). When one-page dot pattern data is written in the frame memory 31, the CPU 25 outputs a start signal (S9 and Ⓒ'). The printer controller 8b' then checks whether a previous sheet is passing through the standby plates 6'. That is, the printer controller 8b' checks at this time whether the trailing portion of the paper sheet P conveyed from the paper feed cassette 4 exists at the position of the standby plate 6' due to the fact that the above-described transfer processing or fixing processing is still being performed (U2). If the previous paper sheet P is passing through the standby plates 6', the printer controller 8b' does not output a driving signal to the first paper feed solenoid 39 even if it receives the start signal. When the trailing end of the paper sheet P passes through the standby plates 6', the printer controller 8b' performs paper feed processing in accordance with the lower paper feed cassette designation data stored in the work memory (U3). More specifically, the printer controller 8b' outputs a driving signal to a second paper feed solenoid 40 to turn it on, thus rotating the pickup roller 19 to pick up the paper sheet P' from the paper feed cassette 18. Therefore, with the above-described operations, the paper sheet P and the subsequently fed paper sheet P' are always conveyed with a predetermined interval therebetween.

When the printer controller 8b' outputs an FD ready signal Ⓓ', and the CPU 25 sets the DMA transfer section 28 and outputs a restart signal Ⓔ', the subsequent processing is performed in the same manner as described manner. As a result, the paper sheet P' reaches the standby plates 6', and printing is performed with respect to the paper sheet P' in accordance with dot pattern data output in synchronism with output of vertical and horizontal sync signals.

As described above, according to the present invention, even if selection of a paper feed cassette from which a paper sheet is required to be fed is changed from the paper feed cassette 4 to the paper feed cassette 18 in accordance with command data from the host computer, conveyance of a paper sheet is performed, immediately after new dot pattern data to be printed on the paper sheet is stored in the frame memory 31, without waiting for completion of a discharging operation of a previous paper sheet, provided that the previous paper sheet is not present at the standby position. Therefore, even with a change in selection of a paper feed cassette, paper feed/conveyance can be performed without interruption.

In the above embodiment, selection of a paper sheet required for printing is changed from a paper sheet in the paper feed cassette 4 to a paper sheet in the paper feed cassette 18. However, the present invention can be applied to the opposite case.

Furthermore, in the above embodiment, the two types of paper feed cassettes are used. It is, however, apparent that the present invention is not limited to the case of the two types of paper feed cassettes.

As has been described in detail above, according to the present invention, even if a plurality of paper feed cassettes are to be switched to perform paper feed processing during a continuous printing operation, paper sheets can be fed with predetermined intervals therebetween, thus realizing a printer having an excellent throughput.

Efficient print processing, therefore, can be performed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A page printer for printing image data in units of pages, comprising:
   a plurality of paper feed sections including a first paper feed section for storing a first paper sheet, and a second paper feed section for storing a second paper sheet different from the first paper sheet;
   a printing mechanism for printing desired image data on the first and second paper sheets sequentially conveyed from said first and second paper feed sections in a predetermined order;
   interface control means including a memory means for storing printing data for a plurality of paper sheets, which are sequentially input from a host unit provided outside said page printer, said interface control means including means for identifying printing data stored in said memory means, and for generating paper feed operation designation data associated with said plurality of paper feed sections, printing operation designation data associated with said printing mechanism and image data to be printed, and said interface control means including transmission means for transmitting said generated image data; and
   printing operation control means responsive to said transmitted data for controlling said printing mechanism in accordance with said paper feed operation designation data, said printing operation designation data, and said image data generated by said interface control means,
   wherein said interface control means further includes means for generating paper feed operation designation data with respect to the second paper sheet on the basis of the printing data stored in said memory means, during a transmission operation of image data with respect to the first paper sheet to said printing operation control means by said transmitting means, and setting a paper feed operation condition for the second paper sheet in said printing operation control means before a printing operation with respect to the first paper sheet is completed, said printing operation control means including means for selecting said second paper feed section, in which the second paper sheet is stored, after a paper feed operation with respect to the first paper sheet is completed and before the printing operation for the first paper sheet is completed, in accordance with the paper feed operation condition.

2. A printer according to claim 1, wherein said printing mechanism includes optical write means for generating optical data in accordance with the image data, and a photosensitive member arranged to be exposed by said optical write means.

3. A printer according to claim 2, wherein said optical write means includes a plurality of light-emitting diodes arranged in an array.

4. A printer according to claim 1, wherein said interface control means comprises a central processing unit for generating the paper feed operation designation data, the printing operation designation data, and the image data, an image data memory for storing the image data, and a DMA (Direct Memory Access) processing unit for outputting the image data stored in said image data memory to said printing operation control means without being controlled by said central processing unit, and when image data corresponding to one-page data of the first paper sheet is generated, said central processing unit executes identification processing of the printing data with respect to the second paper sheet independently of output processing of the image data to said printing mechanism.

5. A printer according to claim 1, wherein said interface control means includes designating means for designating a start of a printing operation with respect to said printing operation control means when one-page image data is generated, and said printing operation control means includes selecting means for selecting one of said first and second paper feed sections in accordance with the paper feed operation condition, and paper feed control means for starting a paper feed operation by using one of said first and second paper feed sections which is selected by said selecting means.

6. A printer according to claim 5, wherein said paper feed control means includes check means for checking a paper feed enable state of the second paper sheet, and starts a paper feed operation of the second paper sheet in accordance with outputs from said designating means and from said check means.

7. A printer according to claim 6, wherein said printing mechanism includes a photosensitive member, a standby mechanism for temporarily holding the first paper sheet after a paper feed operation is started so as to move the paper in synchronism with an image formed on said photosensitive member, and said check means checks that the first paper passes through said standby mechanism.

8. A printer according to claim 7, wherein said paper feed control means includes means for feeding the second paper sheet only after the first paper sheet passes through said standby mechanism.

9. A printer according to claim 7, further comprising means for feeding a paper sheet from said second paper feed section to said standby mechanism in the same period of time required to feed a paper sheet from said first paper feed section to said standby mechanism.

10. A printer according to claim 1, wherein the first paper sheet has a size different from that of the second paper sheet.

11. A printer according to claim 1, wherein the first paper sheet has a paper quality different from that of the second paper sheet.

* * * * *